USO09631601B2

(12) United States Patent
Reitz

(10) Patent No.: US 9,631,601 B2
(45) Date of Patent: Apr. 25, 2017

(54) WIND POWER INSTALLATION

(71) Applicant: Maria Hoernig, Bremen (DE)

(72) Inventor: Georg Reitz, Bremen (DE)

(73) Assignee: Georg Reitz (DE)

( * ) Notice: Subject to any disclaimer, the term of this patent is extended or adjusted under 35 U.S.C. 154(b) by 0 days.

(21) Appl. No.: 14/374,868

(22) PCT Filed: Jan. 24, 2013

(86) PCT No.: PCT/EP2013/051323
§ 371 (c)(1),
(2) Date: Jul. 25, 2014

(87) PCT Pub. No.: WO2013/110696
PCT Pub. Date: Aug. 1, 2013

(65) Prior Publication Data
US 2015/0001851 A1 Jan. 1, 2015

(30) Foreign Application Priority Data
Jan. 25, 2012 (EP) .................................... 12152458

(51) Int. Cl.
F03D 1/04 (2006.01)
F03D 3/04 (2006.01)
F03D 9/00 (2016.01)
(52) U.S. Cl.
CPC ............. F03D 1/04 (2013.01); F03D 3/0427 (2013.01); F03D 9/002 (2013.01);
(Continued)
(58) Field of Classification Search
USPC ..................................................... 290/44, 55
See application file for complete search history.

(56) References Cited

U.S. PATENT DOCUMENTS 4,204,799 A * 5/1980 de Geus .................... F03D 1/04
415/4.5
5,300,817 A * 4/1994 Baird ...................... F03D 9/007
290/1 R
(Continued)

FOREIGN PATENT DOCUMENTS

EP 1916415 A1 4/2008
FR 2954478 A1 6/2011
(Continued)

Primary Examiner — Tulsidas C Patel
Assistant Examiner — Charles Reid, Jr.
(74) Attorney, Agent, or Firm — Jansson Munger McKinley & Kirby Ltd.

(57) ABSTRACT

The present invention pertains to a wind power installation (1) for generating energy, especially electric power, by means of the movement of ambient air, which installation comprises a flow channel (3), in which the ambient air is formed into a stream which flows through the channel, wherein the flow channel (3) comprises an outer jacket (5) forming its boundary, with:

a first section (A) with a tapering, funnel-like cross section, into which a first portion of ambient air enters and is accelerated;

a second section (B) of essentially constant cross section, in which a rotor (20) is present, which can be set into rotation by the through-flowing ambient air, wherein the second section (B) comprises a tubular extension (67);

a third section (C), through which the tubular extension (67) of the second section (B) extends and which comprises a tapering, tubular inlet funnel (44), which surrounds the tubular extension (67) and serves to allow a second portion of ambient air to enter the flow channel (3);

a fourth section (D), in which the tubular extension of the second section (B) terminates, and which comprises a plane of the least cross section (the "0" plane) of the flow channel through which the first and second portions of ambient air flow;

(Continued)

a fifth, expanding, section (E); and
a sixth section (F), which follows the fifth section (E), and in which at least one air acceleration device (11) is arranged.

17 Claims, 5 Drawing Sheets

(52) U.S. Cl.
CPC ........... *F05B 2240/13* (2013.01); *Y02E 10/72* (2013.01); *Y02E 10/74* (2013.01)

(56) References Cited

U.S. PATENT DOCUMENTS

| | | | | |
|---|---|---|---|---|
| 5,464,320 | A * | 11/1995 | Finney | F03D 1/04 415/220 |
| 2007/0018464 | A1* | 1/2007 | Becker | F03D 3/02 290/55 |
| 2009/0280008 | A1 | 11/2009 | Brock | |
| 2010/0060012 | A1* | 3/2010 | Reitz | F03D 1/04 290/55 |
| 2011/0031760 | A1* | 2/2011 | Lugg | F03D 1/025 290/55 |
| 2011/0200428 | A1 | 8/2011 | Ivanovich | |
| 2011/0266802 | A1 | 11/2011 | Alvi | |

FOREIGN PATENT DOCUMENTS

| | | |
|---|---|---|
| JP | 2010537114 A | 12/2010 |
| WO | 2009129309 A2 | 10/2009 |

\* cited by examiner

WIND POWER INSTALLATION

The present invention pertains to a wind power installation for generating energy, especially electrical energy, from the movement of ambient air.

A wind power installation for generating electrical energy is known from EP 1 916 415 B1. The wind power installation of this prior art comprises a flow channel, in which the ambient air is formed into a stream, which flows through the channel, wherein an air acceleration device in the inlet section of the wind power installation accelerates the indrawn ambient air, which then flows into a following, tapering section, in which it is further accelerated. In a next section, the through-flowing ambient air causes a rotor to turn, after which the flow of air is guided into an expanded section, which corresponds to an outlet section, wherein an additional air-acceleration device is provided in the section after that, which returns the flowing air back out into the environment.

The generation of energy according to the wind power installation of EP 1 916 415 B1 is based essentially on the principle of the cooling of the inflowing ambient air, which has a much lower temperature at the outlet than it does at the inlet. Based on the design strategy of the wind power installation according to EP 1 916 415 B1, the inventor has continued his work on the system, i.e., on the principle on which the installation is based, with the goal of improving its efficiency even more and thus of providing a wind power installation of extremely high efficiency.

Proceeding from the associated prior art, the present invention is therefore based on the object of proposing a wind power installation which is more efficient than the prior art, that is, which generates even more energy from the movement of ambient air.

This object is achieved by the features of claim 1.

According to the invention, the wind power installation comprises:

a first section (A) with a tapering, funnel-like, cross section, into which a first portion of ambient air enters and is accelerated;

a second section (B) of essentially constant cross section, in which a rotor is present, which can be set into rotation by the through-flowing ambient air, wherein the second section (B) comprises a tubular extension;

a third section (C), through which the tubular extension of the second section (B) extends and which comprises a tapering, tubular inlet funnel, which surrounds the tubular extension and serves to allow a second portion of ambient air to enter the flow channel;

a fourth section (D), in which the tubular extension of the second section (B) terminates, and which comprises a plane of the least cross section (the "0" plane) of the flow channel through which the first and second portions of ambient air flow;

a fifth, expanding, section (E); and a sixth section (F), which follows the fifth section (E), and in which at least one air acceleration device is arranged.

The surprising discovery was made that efficiency is positively influenced by allowing a second portion of ambient air to enter and by omitting measures for influencing the inflowing first and second portions of ambient air in the inlet area such as by means of an air acceleration device. The wind power installation is thus able to make available a considerably larger amount of energy.

The at least one air acceleration device is located in the outlet section, so that negative effects on the flowing ambient air such as those caused by rotating fans as air acceleration devices can be avoided.

It is advantageous for the wind power installation to be built in modular fashion, at least with respect to the first-to-sixth sections, wherein each section can be easily connected to its adjacent section or sections. This offers significant advantages in terms of production, transport, assembly, maintenance, and repair. The individual modules can be manufactured and transported separately; they can be assembled quickly; and the individual modules can be easily replaced if necessary.

To enhance these advantages, each section is mounted on a base, which is mobile for its own part, which increases the ease with which the modules can be handled even more.

This mobility can be achieved, for example, by the use of support wheels or support rollers mounted on the base, wherein, for example, the support wheels are freely movable i.e. in any direction or can also travel on rails.

In a preferred embodiment, the rotor is part of a turbine, which comprises a stator, also provided in the flow channel, to support the rotor. The stator supports the rotatable shaft of the rotor and advantageously comprises air guide elements, which direct the inflowing first portion of ambient air to the rotor's vanes at a preferred angle of attack.

So that electric power can be generated by a generator, the rotor is connected to a gear wheel, which meshes with another gear wheel, which can drive a generator. The design can thus be easily implemented by the choice of a suitable pair of gear wheels.

Alternatively, the rotor can be connected to the generator by a belt or chain drive, which is connected to a drive wheel of the generator.

The inventive wind power installation can be used not only to generate electric power, however, but also to serve as a work machine, which is able to deliver a corresponding amount of torque or corresponding rotational speed to drive other work machines or working devices. A partial list of examples includes shredders, presses, and pumps.

The advantageous observation was made that the distance between the outlet of the tubular extension of the second section and the plane of least cross section, called the "0 plane" here, of the fourth section depends on the inside diameter of the tubular extension of the second section. Because of the modular design of the individual sections, it is therefore possible to determine the optimal position of the tubular extension empirically by, for example, simply moving the first and second sections relative to the third-to-sixth sections.

In an alternative embodiment, the rotor can also be supported outside the flow channel, i.e. the components which support the rotor can be mounted outside the flow channel, as a result of which the flow channel is freed even further of components which could interfere with the air flow.

In a preferred embodiment, the at least one air acceleration device is designed as a fan. The fan preferably comprises an impeller, which can be set into rotation by a motor.

Conventional fan designs have a motor with a drive shaft, on which the impeller or the vanes of the fan are mounted. Alternatively, the motor of the fan is set up outside the flow channel, which is preferred. This leads to the following advantages:

First, the diameter of the fan can be much smaller. This results in a significant decrease in the overall length of the installation, wherein the frictional losses are also lower.

An externally installed motor will use suitable technical measures such as a belt drive to drive the fan. This offers the second advantage, namely, that the heat produced by the motor is not transferred to the air stream in the outlet section. This is important, because an increase in the heat of the air stream has negative effects on the efficiency of the installation.

According to a preferred embodiment of the inventive wind power installation, a seventh section in the form of an expanding outlet tube or outlet funnel is provided, which follows the sixth section. By suitable design of the rotor vanes of the fan, the air can be made to flow in a direction which already corresponds essentially to the angle of inclination of the expanding outlet tube. This leads to a further increase in the efficiency of the installation.

In a first embodiment, described in detail further below in connection with the figures, the inventive wind power installation is set up so that it is essentially horizontal. Alternatively, however, it can also be set up so that it is essentially vertical, wherein preferably the inlet is at the top and the outlet at the bottom. Because cool air is heavier than warm air, the downward-guided air, which is cooler than the ambient air, positively affects the efficiency of the wind power installation.

As already mentioned above, interference with the through-flowing stream of air negatively affects the efficiency of the wind power installation. For this reason, it is advantageous for the drive device connected to the rotor to be enclosed by a housing, wherein the housing can be optimized with respect to fluid mechanics (droplet shape, etc.).

To increase the energy yield, i.e., the efficiency, of the wind power installation, the flow channel, which is surrounded by a tubular jacket, is optimized by providing the jacket with a suitable low-friction coating on the inside surface to reduce the frictional resistance of the flowing ambient air.

It is also advantageous for the tubular extension to be of essentially constant cross section or to expand in the flow direction.

Additional details, features, and advantages of the present invention can be derived from the following description, which refers to the attached drawings.

In the attached drawings, the same elements or components are designated by the same reference numbers.

Figure 1:
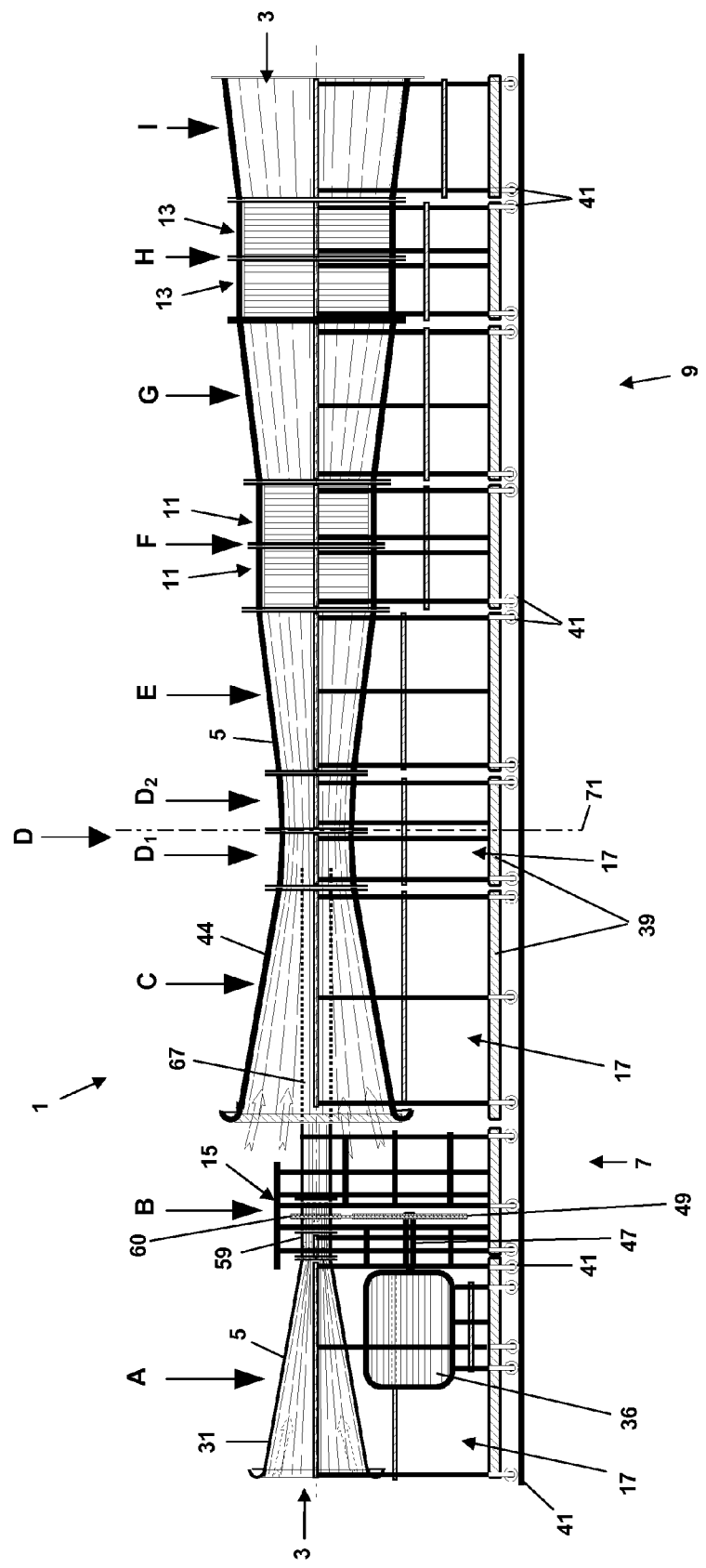
FIG. 1 shows a schematic side view of the inventive wind power installation, divided into its individual sections.

FIG. 1 shows a schematic side view of a first preferred embodiment of the inventive wind power installation 1. The wind power installation 1 is designed in modular fashion and comprises a first section A, a second section B, a third section C, a fourth section D, a fifth section E, a sixth section F, a seventh section G, a eighth section H, and a ninth section I. As can be seen in FIG. 1, the fourth section D is essentially symmetric in design and comprises a boundary plane, here called the "0 plane" 71, which forms the boundary between the inlet or inlet section and the outlet or outlet section of the inventive wind power installation 1. Section D is therefore subdivided into the two sections $D_1$ and $D_2$. Overall, the inlet or inlet section of the inventive wind power installation 1 therefore comprises sections A, B, C, and $D_1$; and the outlet or outlet section thus comprises sections $D_2$, E, F, G, H, and I. The wind power installation 1 comprises a flow channel 3, which extends from the first section A to the last section I. It is surrounded by a tubular outer jacket 5, which can be made of sheet metal, for example. The flow channel comprises an essentially circular cross section.

In a first section A, the flow channel 3 comprises an inlet funnel 31, which tapers continuously. Into this inlet funnel 31, a first portion of ambient air enters. In the second section B, the flow channel comprises an essentially constant cross-sectional surface with a turbine tube 54, 59 and a tubular extension 67, as will be explained in greater detail further on with reference to FIG. 3.

The wind power installation 1 comprises a third section C, which comprises another inlet funnel 44, which tapers down continuously, and into which a second portion of ambient air enters. This air also flows along the outside surface of the tubular extension 67.

In the middle of the fourth section D is the boundary surface, called the "0 plane" 71 with the smallest cross section of the combination flow channel made up of the first portion of ambient air and the second portion of ambient air, i.e. the first and second portions of ambient air flow through this channel. The 0 plane 71 forms the boundary between the inlet section 7 and the outlet section 9. The two sections are described in greater detail below with reference to FIGS. 3-5.

In the fifth section E, the flow channel 3 widens out again, and it is followed in the next section, i.e., the sixth section F, by two air acceleration devices. The sixth section F comprises an essentially constant cross section.

In a seventh section G, the flow channel 3 widens out further and is followed in the eighth section H by two additional air acceleration devices 13. The eighth section H comprises an essentially constant cross section. The wind power installation 1 terminates, finally, with a ninth section I, in which the flow channel expands even more.

To save space, the generator 36 is set up outside the first section A. It comprises a driveshaft 47, on which a drive wheel 49 is mounted, which is connected in turn to a drive wheel 60 of a turbine 15.

As can also be seen in FIG. 1, and as will be explained in greater detail below, each of sections A-I is supported by an appropriate support structure 17. All of these supports structures for each of sections A-I are supported in turn on individual bases 39. The base 39 comprises for its own part support wheels 41, so that the each of modular sections A-I can be moved individually.

Figure 2:
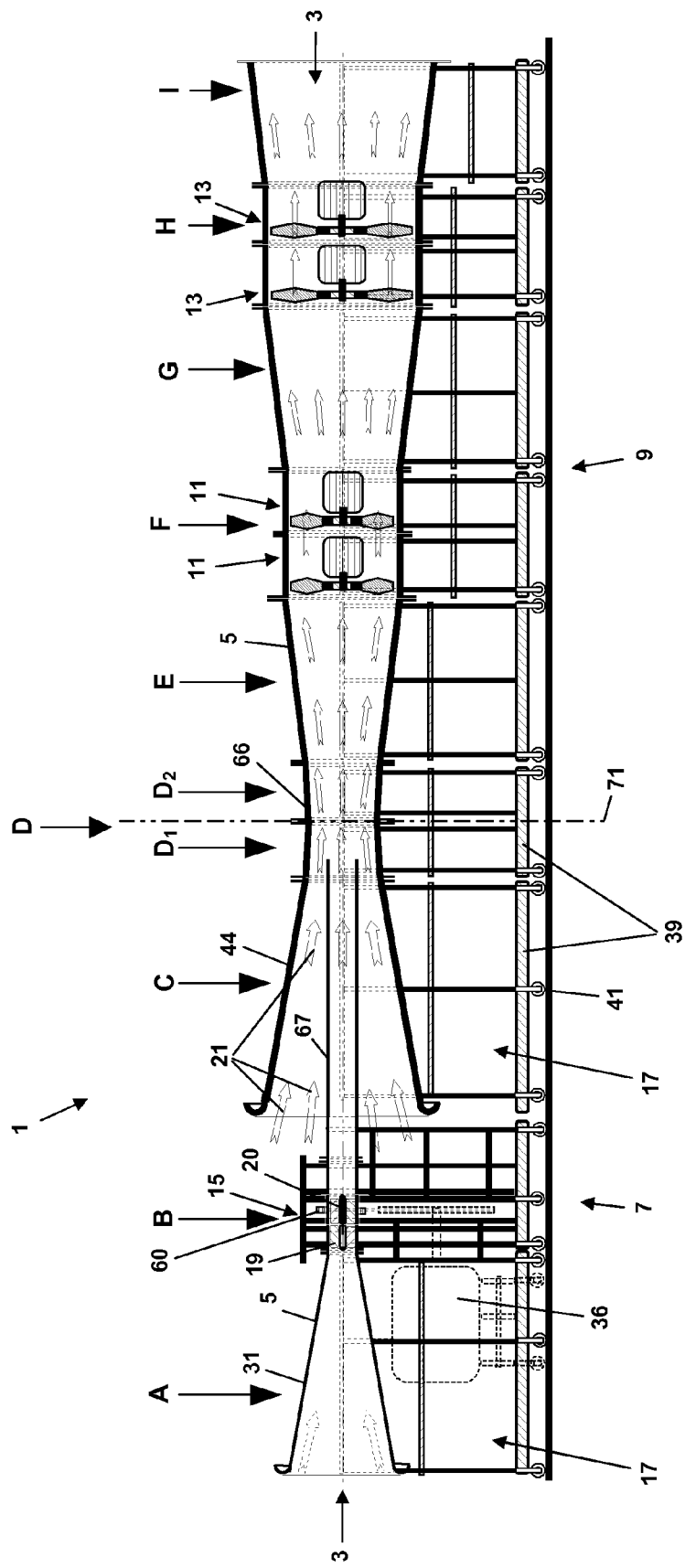
FIG. 2 shows a cross-sectional view through the wind power installation of FIG. 1.

FIG. 2 shows a schematic cross section of the inventive wind power installation of FIG. 1. In particular, the stator 19 and the rotor 20 of the turbine 15 are shown, as will be explained in greater detail below with reference to FIGS. 3-5. The arrows 21, furthermore, represent the flow of the second portion of ambient air. In the outlet section 9, we see more clearly the air acceleration devices 11 and 13, which are designed in the form of fans.

Figure 3:
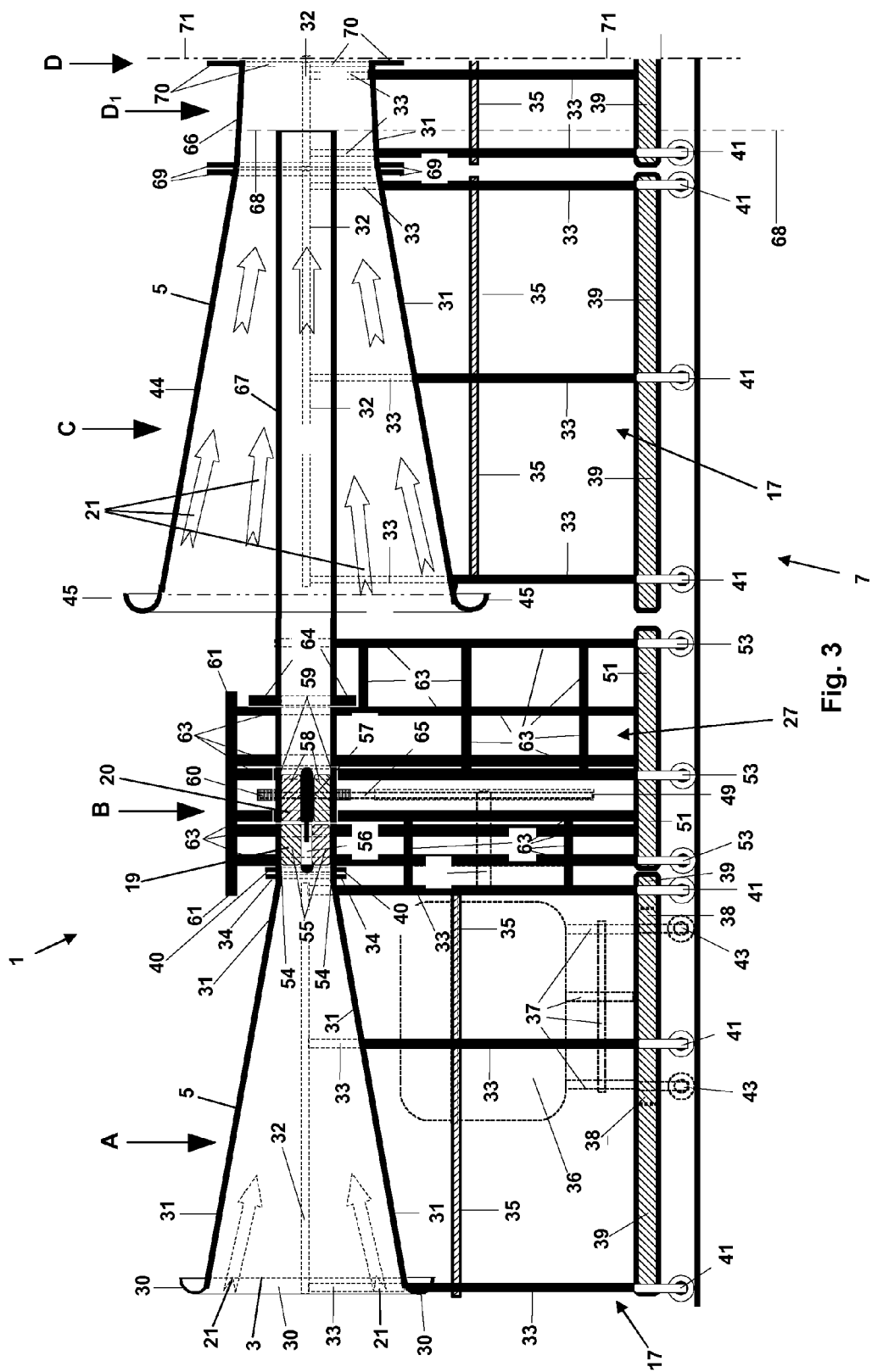
FIG. 3 shows an enlarged cross-sectional view of the inlet section up as far as the 0 plane.

Reference will now be made to FIG. 3, in which a cross-sectional view of the inlet section 7 according to FIG. 2 is shown on a larger scale. The inlet funnel 31, which surrounds the flow channel 3 in the first section A and which serves to accept the first portion of ambient air as indicated by the arrows 21, comprises at its forward end a rounded inflow device 30. The inlet funnel 31 is mounted on a support structure 17, which, in the case of the example in question here, is designed as follows.

The support structure 17 comprises vertical support beams or struts 33 and horizontal support or reinforcing struts 32 and 35, which are connected to each other. The horizontal support struts 32, 35 extend both parallel and transversely to the axis of the flow channel 3. The inlet funnel 31 rests on and in this frame-like support structure 17. The support structure 17 itself rests on a base 39, which is designed in the form of a flat plate. So that the first section A can be moved or transported, support rollers 41 are mounted on the base 39; these rollers support the entire first section A and thus make it mobile.

To the end of the inlet funnel 31 opposite the inflow device 30, a flange ring 34 is attached, which serves to connect the funnel to a flange ring 40, which is attached to the turbine tube 54. By means of detachable connections such as threaded bolts and nuts, the two flange rings 34 and 40 can be connected to form a continuous flow channel 3 and also disconnected from each other again.

In the cross-sectional view of FIG. 3, the illustrated elements which lie beyond the cross-sectional plane are drawn in broken line.

The second section B accommodates the energy generating or converting device in the form of the turbine 15. The turbine 15 comprises a rotor 20 with a rotor shaft 57 and the rotor vanes 58. A stator 19, with a hub 56, into which the rotor shaft 57 fits, is provided to support the rotor shaft. The stator comprises vanes 55, which have the job of diverting the incoming ambient air in such a way that it arrives at the vanes 58 of the rotor 20 at the desired angle. The stator 19 is surrounded by the turbine tube 54, and the rotor 20 is surrounded by the turbine tube 59.

The second section B comprises a support structure 27, which comprises a plurality of vertical and horizontal supports or struts 63, which form a frame-like support structure, which is mounted on a base 51 in the form of a plate-shaped element. The plate-shaped element 51 for its own part rests on support wheels 53, as a result of which the second section B is also mobile.

The struts 63 are covered by a roof-like structure 61, which serves to absorb forces.

In FIG. 3, because the generator 36 is located behind the flow channel 3, it is illustrated only in broken lines. The generator 36 rests on a support structure 37 with vertical and horizontal struts. The support structure 37 rests on a base 38, which is designed as a plate similar to that of bases 39 and 51. So that the generator can be moved, the base 38 again rests on support rollers 43.

The turbine tube 59 is followed by a tubular extension 67, that is, by the outflow tube of the turbine 16. In the case of the example discussed here, the extension 67 has the same diameter as the turbine tube 54, 59. A ring flange 64 is provided, to which, for example, the associated support structure struts 63 can be connected.

The rotor 20 comprises an encircling outside rim 60. By means of an appropriate gear wheel belt 65, this rim can transmit a driving force to the drive wheel 49 of the generator 36, the drive wheel being mounted on the generator shaft 47.

The tubular extension 67 extends through the entire third section C of the inventive wind power installation 1 as far as the first subsection $D_1$ of the fourth section D. The third section C comprises an inlet funnel 44 with an inflow device 45 for the second portion of ambient air, as indicated by the arrows 21.

As can be seen in FIG. 3, the second portion of ambient air flows along the outside of the tubular extension 67 until it reaches a plane 68 at the end of the extension 67; the distance of this plane from the 0 plane 71 depends on the inside diameter of the tubular extension 67. Because the first section A and the second section B can be moved as a unit relative to the third and all the other sections C-I, it is possible to find empirically the optimal position for the plane 68, that is, the optimal distance between the outlet of the tubular extension 67 and the 0 plane 71, and to set the plane in that position permanently.

The inlet funnel 44 of the third section C, like the inlet funnel 31 of the first section A, rests on a comparable frame-like support structure 17 with vertical supports 33 and horizontal reinforcing struts 32, 35, wherein this support structure 17 for its own part rests on the plate-shaped base 39. This plate-shaped base 39 rests in turn on support wheels 41, which provide it with mobility.

So that the third section can be connected to the fourth section D, the outlet side of the inlet funnel 44 and the inlet side of the fourth section both have ring flanges 69, which can be easily connected and disconnected from each other.

In its subsection $D_1$, the fourth section D comprises a tubular jacket 66 in the form of another inlet funnel, which extends to the 0 plane 71. At the 0 plane 71 of the inlet or inlet section 7, another ring flange 70, the last one of the inlet section, is located on the tubular jacket 66; this flange cooperates with a ring flange 72 of a tubular outlet funnel 73 of the flow channel 3. The two halves $D_1$ and $D_2$ of the fourth section D also comprise support structures 32, 33, 35, supported on bases 39, which for their own part rest on support wheels 41.

Figure 4:
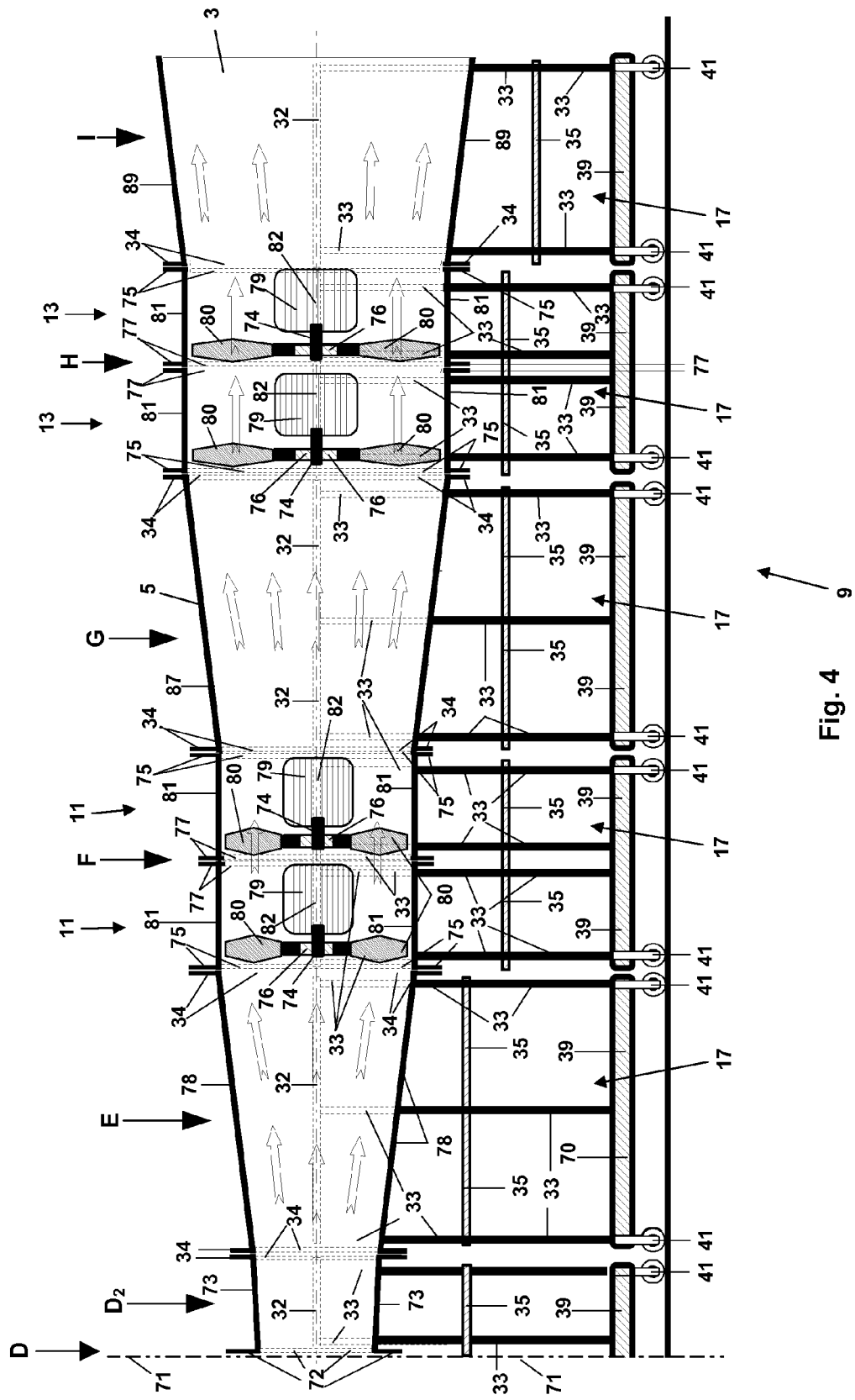
FIG. 4 shows a cross-sectional view, on an enlarged scale, of the outlet section, beginning at the 0 plane.

As can be seen in FIG. 4, the fourth section D is connected by another ring flange connection 34 to another outlet funnel 78, which, as shown in the example here, expands with a different angle than that of the outlet funnel 73.

The outlet or outlet section 9, shown in detail in FIG. 4, comprises a series of connected sections, namely, the subsection $D_2$ of the fourth section D, the fifth section E, the sixth section F, the seventh section G, the eighth section H, and the ninth section I. As can be seen in FIG. 4, comparable support structures 17 with supports and struts 32, 33, 35 are again provided to support the flow channel 3, wherein support rollers 41 are again provided on the bases 39 to support the support structures 17 and thus give the individual sections mobility.

Ring flanges 34, 75, 77 are provided, which make it possible not only to connect the individual sections to each other easily but also to disconnect them for maintenance, etc. The fifth section E with its outlet funnel 78 expands to the 6th section F, in which two fans 11, which can be disconnected via the flanges 77, are installed. The fans comprise impellers or vanes 80, which are mounted rotatably on motor shafts 74 and are driven by the motors 79. The impellers 80 are mounted on drive wheels 76.

A jacket or tube 81 surrounds the flow channel 3 in the sixth section F and also in the eighth section H. In this eighth section H, there are again two fans 13 installed, which have the same design as the fans 11 but are somewhat larger. Reference number 82 designates a reinforcing structure for the fan jacket 81.

A seventh section G extends between the sixth section F and the eighth section H; this seventh section is designed in the form of an expanding funnel 87. Following the eighth section H with the two fans 13 is an additional section, namely, the ninth section I with an expanding outlet funnel 89.

FIG. 4 shows a first embodiment of the outlet section 9 of the present invention. In principle, the wind power installation 1 can also comprise only one of the two fans 11, and the sections G-H are optional. The larger the amount of energy to be supplied, the larger the number of fans required.

Figure 5:
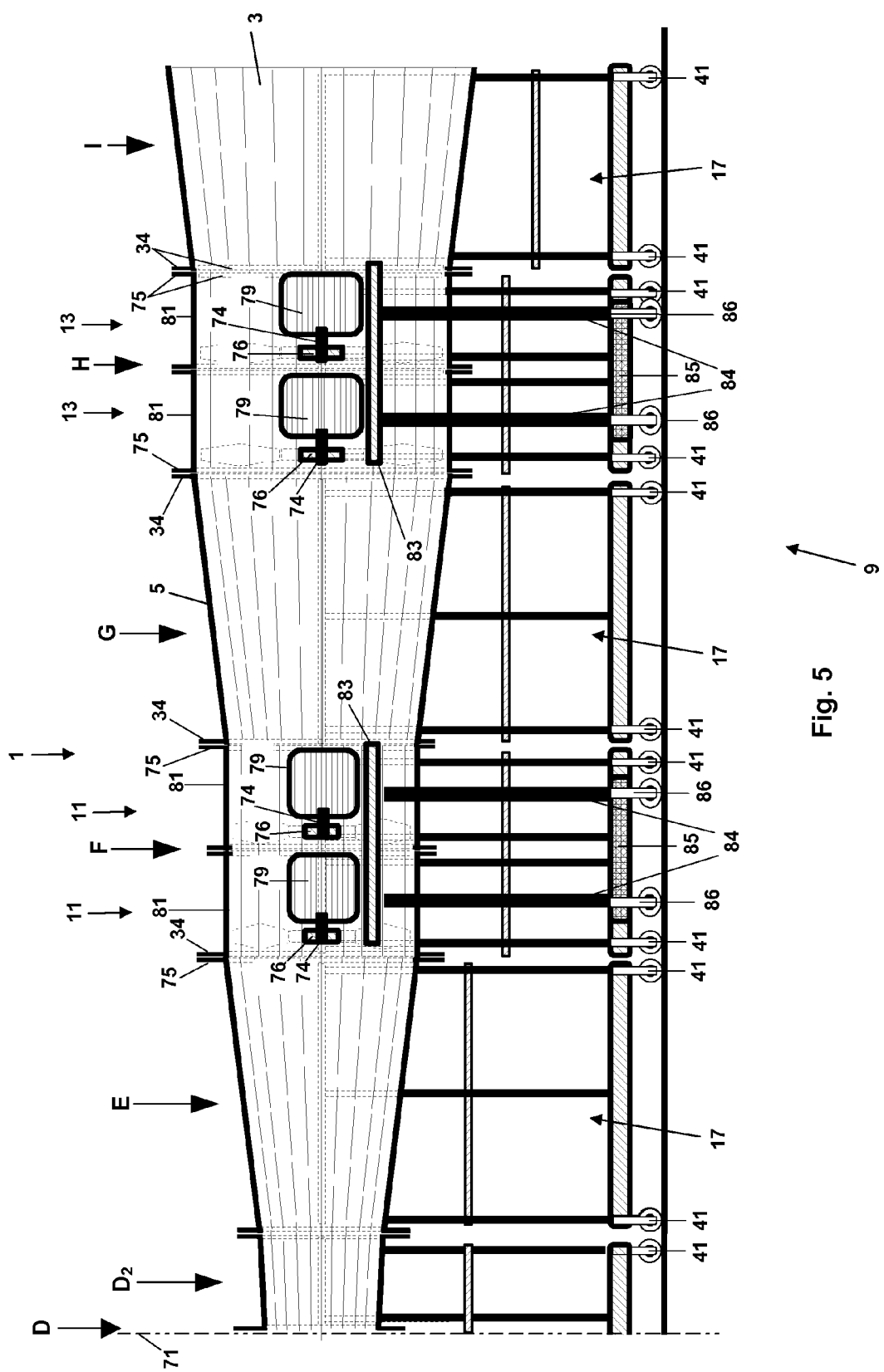
FIG. 5 shows a side view of an alternative embodiment of the outlet section according to FIG. 4.

As already explained above, obstacles to the flow of air in the flow channel 3 are disadvantageous to the efficiency of the overall wind power installation. FIG. 5 shows an alternative embodiment of the fans 11 and 13 in which the motors 79 are shifted laterally out from the flow channel 3, wherein the vanes 80 can be driven via the drive wheels 76 on the motor shafts 74. This can be done by means of belts, for example, wherein, to achieve a further reduction in the amount of interference in the flow channel, a housing (not shown) for the belt drives suitably designed from the standpoint of fluid mechanics can be provided in the flow channel.

The motors 79 are mounted on a base 83, which rests on vertical supports 84. As also in the case of the other components or sections, the supports are mounted on a plate 85, which for its own part can travel on support wheels 86, as a result of which the motors 79 together with their shafts 74 and drive wheels 76 can be moved.

The present invention creates a wind power installation by means of which energy, especially electrical energy, can be recovered from the movement of ambient air, wherein the power consumed by the fans is significantly less than the energy supplied by the turbine, thanks to the significant cooling of the air stream flowing through the turbine.

Another advantage of the present invention is derived from the fact that the air stream emerging from the flow channel 3 is much cooler than the incoming stream of air, which makes it suitable for use in climate control (cooling) systems.

The invention claimed is:

1. A wind power installation for generating electric power by means of movement of ambient air, the installation including a flow channel having a boundary formed by an outer jacket in which the ambient air is formed into a stream flowing through the channel, the channel comprising seriatim:
    a first section with a tapered funnel-like cross-section of decreasing cross-section into which a first portion of ambient air enters and is accelerated;
    a second section of substantially constant cross-section formed by a tube and having a rotor therein which is rotatable by the through-flow of ambient air, the rotor coupled to and driving a generator;
    a third section into and through which an extension of the tube of the second section extends such tube extension having the substantially constant cross-section, the third section including a tapered inlet funnel of decreasing cross-section surrounding the tube extension and serving to allow a second portion of ambient air to enter the flow channel around the tube extension;
    a fourth tapered section in which the tube extension terminates, said fourth section ending in a cross-sectional plane of least cross-section through which the first and second portions of ambient air flow;
    an expanding fifth section; and
    a sixth section in which at least one air acceleration device is arranged.

2. The wind power installation of claim 1 in a modular form, each of the first through the sixth sections being readily connectable to its respective adjacent section(s).

3. The wind power installation of claim 2 wherein each section is mounted on its own mobile base.

4. The wind power installation of claim 1 wherein each section is mounted on its own mobile base.

5. The wind power installation of claim 1 wherein the rotor is part of a turbine which includes a stator that is also arranged in the flow channel.

6. The wind power installation of claim 1 wherein the rotor is connected to a gear wheel which meshes with another gear wheel that can drive a generator.

7. The wind power installation of claim 1 wherein the rotor is connected to a belt or chain drive that is connected to the drive wheel of a generator.

8. The wind power installation of claim 1 wherein the distance between the outlet end of the extension tube of the second section and the cross section plane of the smallest cross section of the fourth section depend on the inside diameter of the tube of the second section.

9. The wind power installation of claim 1 wherein the rotor is supported from outside the flow channel.

10. The wind power installation of claim 1 wherein the at least one air acceleration device includes a fan.

11. The wind power installation of claim 10 wherein the fan includes an impeller or vanes which can be set into rotation by a motor.

12. The wind power installation of claim 11 wherein the motor of the fan is set up outside the flow channel.

13. The wind power installation of claim 1 further including a seventh section in the form of an expanding outlet tube, the seventh section following the sixth section.

14. The wind power installation of claim 1 oriented in a substantially vertical direction, with the inlet at the top and the outlet at the bottom.

15. The wind power installation of claim 6 wherein drive linkage extending from the rotor toward generator is enclosed by a housing.

16. The wind power installation of claim 7 wherein drive linkage extending from the rotor toward generator is enclosed by a housing.

17. The wind power installation of claim 1 wherein the tube is of substantially constant cross-section or expands in the flow direction.

* * * * *